B. W. HILL.

VALVE.

No. 11,652. Reissued Mar. 1, 1898.

WITNESSES

L. Douville,

P. F. Nagle.

INVENTOR.

Burton W. Hill.

BY

Dieterich & Fairbanks.

ATTORNEYS.

THE NORRIS PETERS CO., PHOTO-LITHO., WASHINGTON, D. C.

UNITED STATES PATENT OFFICE.

BURTON W. HILL, OF SOMERVILLE, MASSACHUSETTS.

VALVE.

SPECIFICATION forming part of Reissued Letters Patent No. 11,652, dated March 1, 1898.

Original No. 573,656, dated December 22, 1896. Application for reissue filed June 16, 1897. Serial No. 641,057.

*To all whom it may concern:*

Be it known that I, BURTON W. HILL, of Somerville, in the county of Middlesex and State of Massachusetts, have invented certain new and useful Improvements in Valves, of which the following is a specification.

This invention has for its object to provide a valve adapted particularly for use in connection with a steam-trap of a form which comprises a chamber mounted on tubular trunnions, one of which is connected with a steam and water inlet and the other with an outlet and with a valve, the chamber being weighted so that it normally stands in position to close the said valve, but when filled with water the chamber overcomes the weight and turns on its trunnions, thus opening the valve and permitting the discharge of water.

My present invention consists in certain improvements comprising a valve adapted to be opened and closed by oscillating movements of a rotary conduit, such as the outlet-trunnion of the trap above described, and to be closed more positively and with less liability to leakage than heretofore.

The invention consists in the improvement which I will now proceed to describe and claim.

Figure 1:
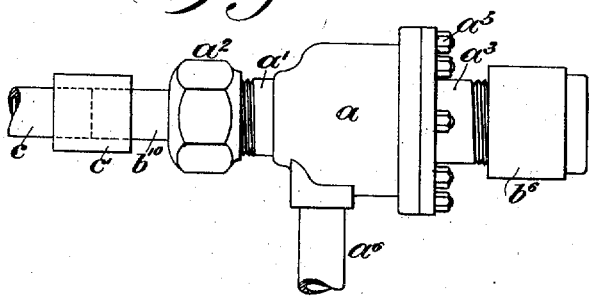
Figure 2:
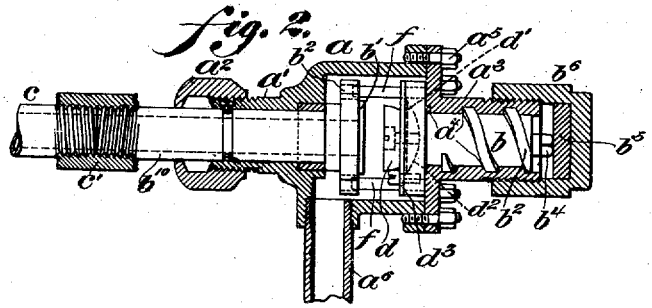
Figure 3:
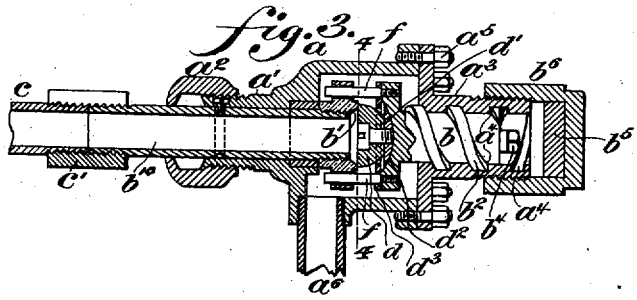
Figure 4:
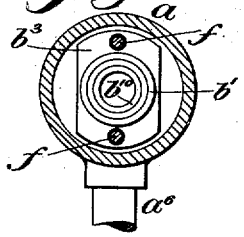

Of the accompanying drawings, forming a part of this specification, Figure 1 represents a side elevation of my improved valve. Fig. 2 represents a longitudinal section of the same, the valve being opened. Fig. 3 represents a view similar to Fig. 2, the valve being closed. Fig. 4 represents a section on line 4 4 of Fig. 3.

The same letters of reference indicate the same parts in all the figures.

The casing of my improved valve comprises the body $a$, the tubular neck $a'$ at one end of said body, having a stuffing-box $a^2$, and the tubular valve guide or nut $a^3$ at the other end of the casing, said guide having an internal screw-thread $a^4$ and being connected with the body $a$ by means of screws or bolts $a^5$. The body $a$ has an outlet or waste pipe $a^6$, which may extend to any convenient point. Within the neck $a'$ of the casing is journaled a tubular conduit $b^{10}$, which extends through the stuffing-box $a^2$ and is adapted to rotate therein. The said conduit may be considered an extension of the outlet-trunnion $c$ of a steam-trap, and is here shown as rigidly connected by a coupling $c'$ with said trunnion, so that the conduit $b^{10}$ will rotate with the trunnion. The conduit $b^{10}$ is provided at its inner end with an annular valve-seat $b'$, which opens into the space within the body $a$ of the casing and communicates through said space with the outlet $a^6$, so that when the said valve-seat is unobstructed water can flow from the trunnion $c$ through the conduit $b^{10}$ and through the casing to the outlet $a^6$.

$d$ represents a valve which is formed to close upon the seat $b'$. Said valve is secured to a stem $b$, which has a screw-thread $b^2$ engaged with the internal thread $a^4$, formed in the guide $a^3$. The stem $b$ and valve $d$ are connected with the conduit $b^{10}$ by a sliding connection, which imparts a rotary motion from the conduit to the valve and at the same time permits the valve to move toward and from the seat $b'$. Any suitable sliding connection adapted to operate as above indicated may be employed. I have here shown as such connection two pins or rods $ff$, affixed to a flange on the stem $b$ and passing loosely through orifices $b^8$, formed in a flange on the conduit $b^{10}$, said pins being parallel with the valve-stem and sliding freely in the orifices $b^8$.

It will be seen that when the conduit $b^{10}$ is rotated by the water-discharging movement of the chamber of the steam-trap, the casing being of course stationary, the valve-stem $b$ will be rotated in the same direction and will be caused by the engagement of its screw-thread with the thread in the fixed guide $a^3$ to move from the valve-seat and open the latter, as shown in Fig. 2, so that the water can escape freely through the conduit $b^{10}$, the casing $a$, and the outlet $a^6$. When the conduit $b^{10}$ is rotated in the opposite direction by the return movement of the chamber to its normal position after the discharge of the water, the valve is moved in the opposite direction, thus closing on the seat, as shown in Fig. 3. I find that by moving the valve toward and from the valve-seat I obtain a more satisfactory result, there being much less liability of leakage, thus making the trap more efficient and more easily kept in order.

In a device of the character specified the rotation of the conduit $b^{10}$ must be less than a complete one. Therefore in order to properly operate the valve the pitch of the screw-threads must be such or so steep as to open the valve for a prompt and adequate clearance within considerable less than a full revolution of the conduit.

The valve $d$ preferably has a somewhat loose or rocking connection with the stem $b$ by means of a convex base or plate $d'$, affixed to the valve, as shown in Fig. 3, said plate bearing loosely upon a concave seat $d^2$, formed on the end of the stem $b$ and retained in place on said seat by means of a flange $d^3$, which is affixed to the stem and has an orifice somewhat larger than the body of the valve next to the base $d'$, said orifice loosely surrounding the valve, while its margin overhangs the concave seat and the edge of the base $k'$, the base being therefore permitted to rock or tip slightly with the flange on the end of the stem, so that the valve accommodates itself more perfectly to the seat than it would if rigidly attached to the stem.

The outer end of the stem $b$ is provided with an adjustable stop-screw $b^4$, which limits the outward movement of the valve and stem by striking against a hardened-steel plate $b^5$, inserted in a nut $b^6$, screwed upon the guide $a^3$.

I do not limit myself to the employment of the improved valve hereinbefore described in a steam-trap and may use it for any other purpose or purposes to which it is applicable.

I claim—

1. An appliance of the character specified, comprising a stationary casing having an outlet, a conduit journaled to turn in the casing and constituting the inlet thereof, an annular valve-seat at the inner end of said conduit communicating with said outlet, a valve opposite said seat having a steep-pitched screw-threaded stem engaged with an internal thread in the casing, whereby the valve may be opened for a prompt and adequate clearance within less than a full revolution of the conduit, and a connection between the conduit and valve, through which rotary motion is communicated from the conduit to the valve to cause a longitudinal movement of the valve.

2. An appliance of the character specified, comprising a stationary casing having a stuffing-box at one end, an internal screw-thread at the other end, and an outlet intermediate of said ends, a rotatable inlet tube or conduit journaled in the casing and passing through the stuffing-box, said conduit having an annular valve-seat at its inner end communicating with the outlet of the casing, a valve in the casing opposite the said seat and provided with a stem having a steep-pitched screw-thread engaged with the screw-thread on the casing, and a sliding connection for the conduit and valve, said connection being guided in an orifice in said rotatable conduit.

BURTON W. HILL.

Witnesses:
C. F. BROWN,
E. BATCHELER.